(No Model.) 5 Sheets—Sheet 1.

L. M. JONES & J. K. WEDLAKE.
SHEAF CARRIER FOR HARVESTER BINDERS.

No. 480,468. Patented Aug. 9, 1892.

Witnesses
J. Edw. Maybee
W. G. McMillan

Inventors
Lyman M. Jones
James K. Wedlake
by Donald C. Ridout & Co.
Attys (No Model.)  5 Sheets—Sheet 3.

L. M. JONES & J. K. WEDLAKE.
SHEAF CARRIER FOR HARVESTER BINDERS.

No. 480,468. Patented Aug. 9, 1892.

(No Model.) 5 Sheets—Sheet 4.
L. M. JONES & J. K. WEDLAKE.
SHEAF CARRIER FOR HARVESTER BINDERS.

No. 480,468. Patented Aug. 9, 1892.

(No Model.) 5 Sheets—Sheet 5.

L. M. JONES & J. K. WEDLAKE.
SHEAF CARRIER FOR HARVESTER BINDERS.

No. 480,468. Patented Aug. 9, 1892.

Witnesses
J. Edw. Maybee
W. G. McMillan

Inventors
Lyman M. Jones
James K. Wedlake
by Donald C. Ridout & Co.
Attys

UNITED STATES PATENT OFFICE.

LYMAN M. JONES AND JAMES K. WEDLAKE, OF TORONTO, CANADA, ASSIGNORS TO THE MASSEY-HARRIS COMPANY, LIMITED, OF SAME PLACE.

SHEAF-CARRIER FOR HARVESTER-BINDERS.

SPECIFICATION forming part of Letters Patent No. 480,468, dated August 9, 1892.

Application filed December 10, 1891. Serial No. 414,622. (No model.)

*To all whom it may concern:*

Be it known that we, LYMAN MELVIN JONES and JAMES KENT WEDLAKE, of the city of Toronto, in the county of York, in the Province of Ontario, Canada, have jointly invented a certain new and Improved Sheaf-Carrier for Harvester-Binders, of which the following is a specification.

The object of the invention is to design a sheaf-carrier which will discharge the sheaves in straight and even rows; and it consists, essentially, of a series of fingers situated below the discharge side of the binder-table and operated by mechanism arranged to first drop the fingers so as to partially discharge the sheaves and then swing the said fingers from under and around clear of the discharged sheaves, substantially as hereinafter more particularly explained.

Figure 1:
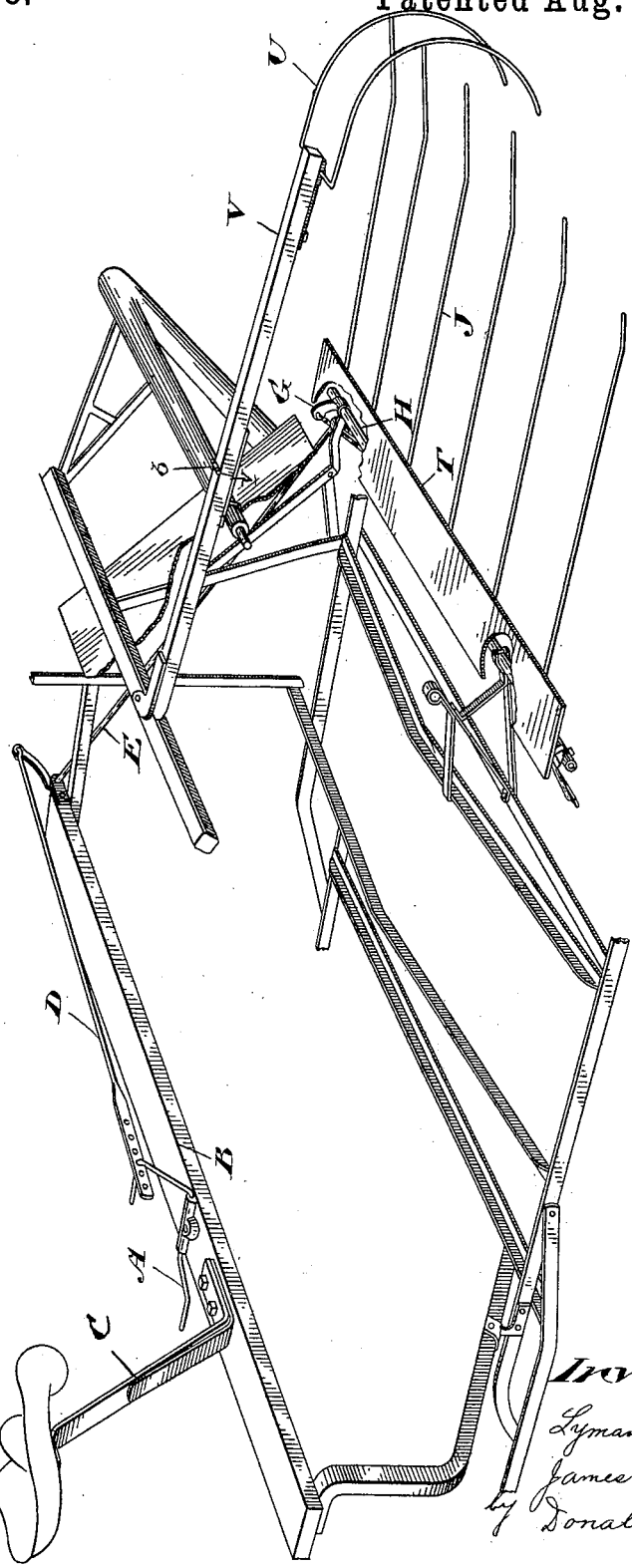
Figure 2:
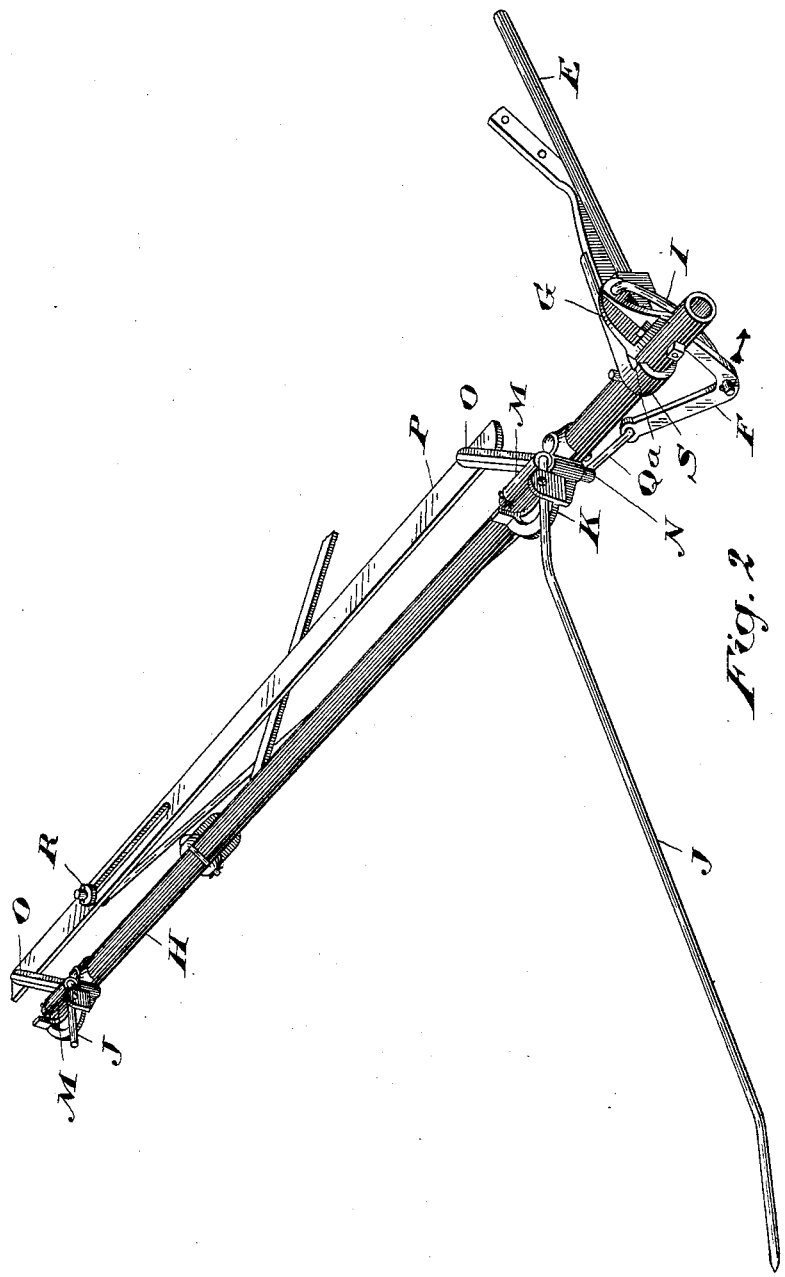
Figure 3:
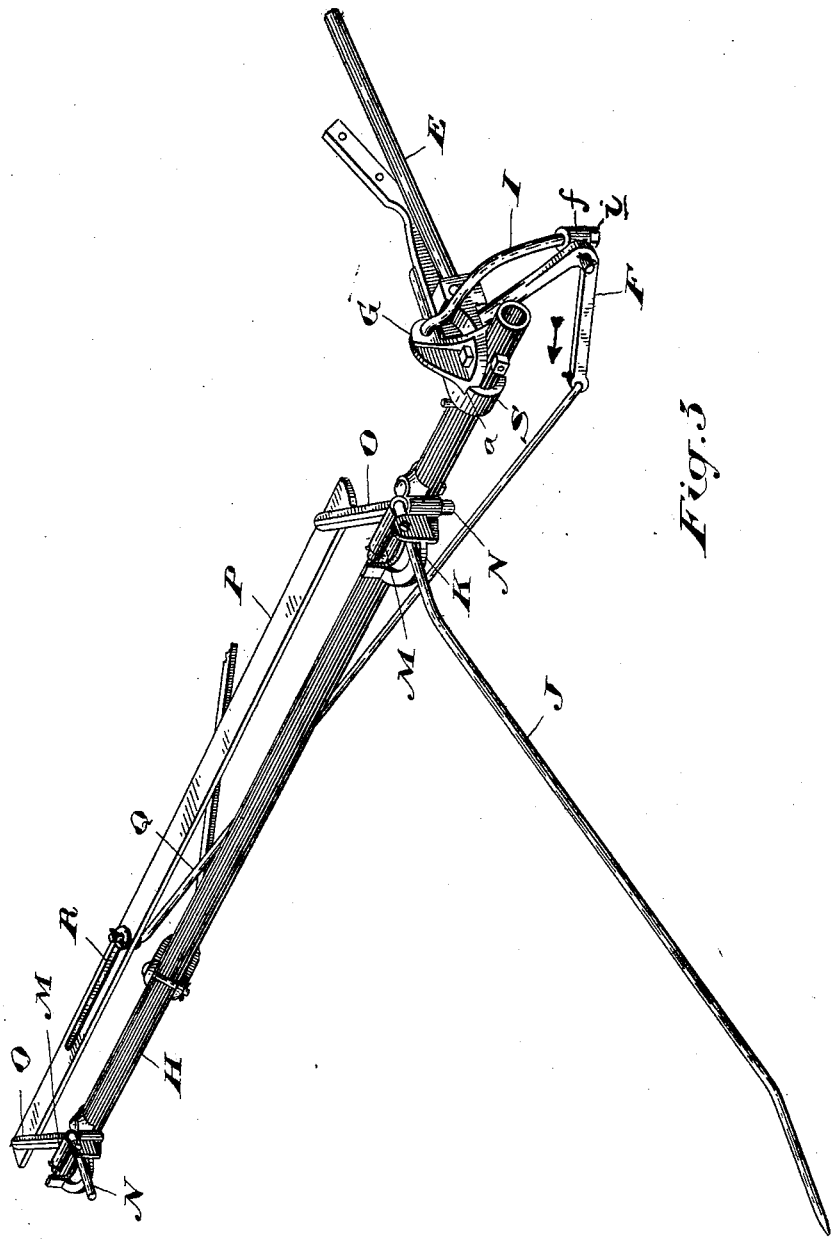
Figure 4:
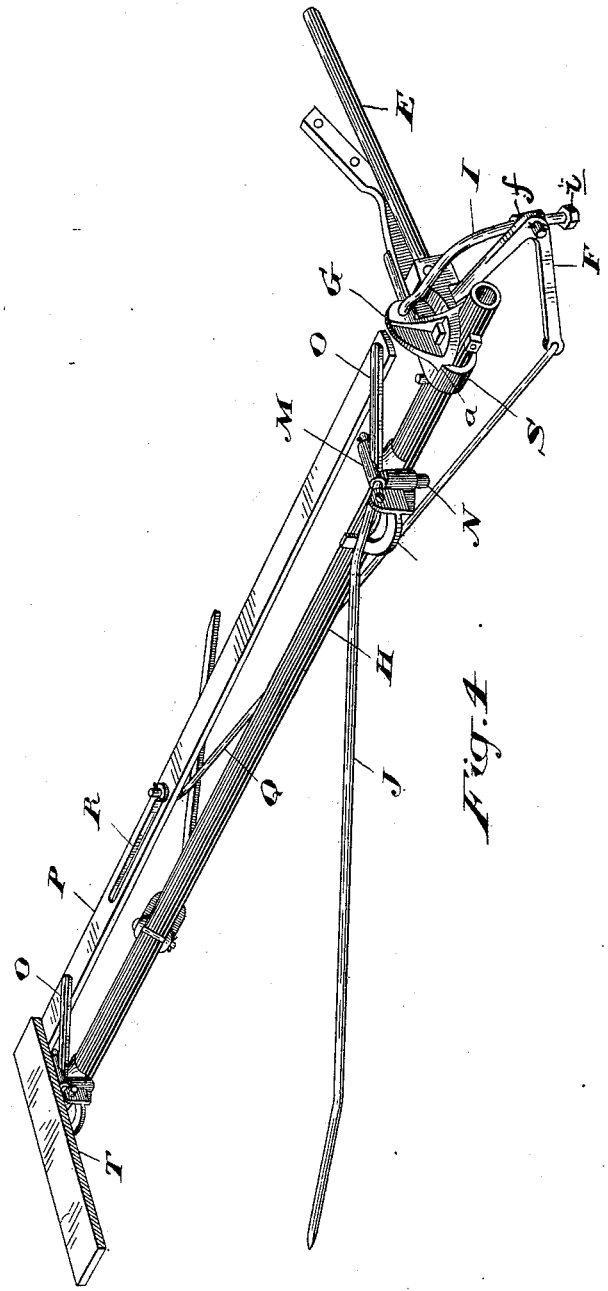
Figure 5:
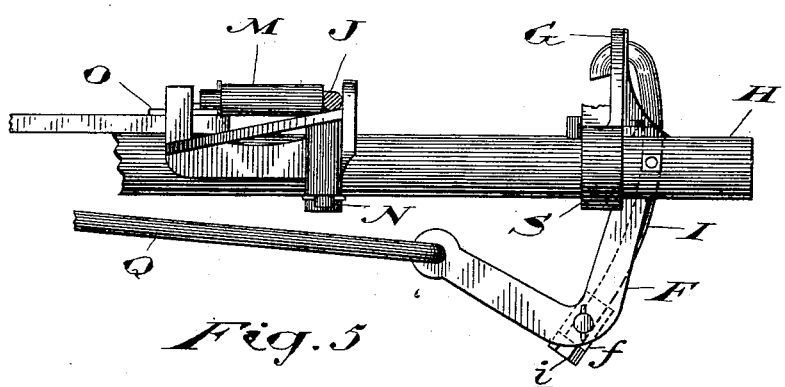
Figure 6:
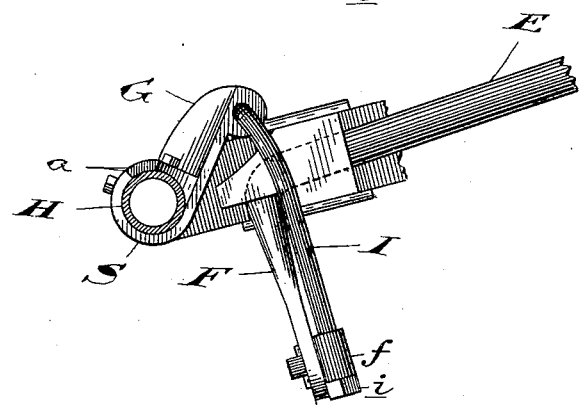

Figure 1 is a perspective skeleton view of the parts connected with our invention. Fig. 2 is an enlarged perspective detail of the operating mechanism in the first position. Fig. 3 is an enlarged perspective detail of the operating mechanism in the second position. Fig. 4 is an enlarged perspective detail of the operating mechanism in the third position. Figs. 5 and 6 are details on a still larger scale.

Before describing the operation of our improved carrier we will first proceed to explain the details of its construction, commencing at the point where the mechanism is operated by the driver.

A is a foot-crank journaled on the footboard B in proximity to the seat C.

D is a rod connecting the foot-crank A to a crank formed on the rod E. This rod is suitably journaled in the frame of the machine and has a double crank F formed on its lower end. (See Figs. 2 and 3.) A bracket G is fixed to the rock-shaft H, which is suitably journaled in brackets fixed to the frame of the machine.

At I is shown a rod, one end of which is bent, as shown in Fig. 5, and passes through the lug G, as shown in Fig. 6, while the other passes through a sleeve *f*, pivoted in the double crank F. At the lower end of the rod I is a nut *i*.

The rod H carries several fingers J; but in Figs. 2, 3, and 4 we only show one, as that is sufficient for the purpose of illustration.

K is a quadrant-shaped bracket fixed to the rock-shaft H. The inner end L of each finger is bent at right angles and fits into a horizontal journal-box M, which box has a vertical stud N, which fits into a suitable vertical bearing formed in the bracket K. These two journals permit the finger J to have a free vertical movement as well as a swinging horizontal movement. The quadrant-shaped portion of each bracket K is set at an angle, as shown in Fig. 5, so that each finger, when not otherwise held, has a tendency to fall downwardly toward a position parallel with the rock-shaft H. Each journal-box M has an arm O projecting from it, which arm is pivoted to a bar P. In this way all the fingers are connected together by the bar P, and consequently all the fingers must work at once.

Q is a rod connected to the lower end of the the double crank F and extending to the slot R, made in the bar P. The said rod is connected to the bar P, as indicated, in such a manner that the connection will not interfere with the free horizontal movement of the bar P, except when the rod Q butts against either end of the said slot.

On reference to Figs. 1 and 2 it will be observed that the fingers J all extend out from and at right angles to the rock-shaft H, the said fingers forming a horizontal carrier for the sheaves. On reference to Fig. 2 it will be observed that owing to the position of the crank F the end of the rod Q is held against the end of the slot R, thereby locking all the fingers J in the horizontal position shown. It will also be observed that the bracket G is away from the shoulder *a*, formed in the hub of the arm S, which supports the end of the rock-shaft H. It will be noticed that the lug G cannot move to rock the shaft H till the rod E and crank F are moved, as the center on which the crank F works is in such relation to the points of attachment of the rod I to the crank F as to tend to draw it in the contrary direction to that marked by arrow, whereas it is only capable of motion in the direction so marked.

When the driver wishes to drop the sheaves off the carrier, he presses his foot on the nearest arm of the crank A, which action causes the rod E to roll, turning the crank F in the direction indicated by an arrow in Fig. 2. The turning of the crank F, which normally, by means of the rod I, holds down the bracket G, as in Figs. 2 and 5, allows the weight of the fingers or the sheaves thereon to roll the rock-shaft H, so as to lower the ends of the fingers J, the drop of the fingers being sufficient to permit the sheaves to fall off or partially off the carrier. By the time that this drop is effected the end of the rod Q has reached the end of the slot R, striking the said end with sufficient force to give the bar P a longitudinal impetus of sufficient force to cause all the fingers J to swing on their respective pivots toward a position parallel with the rock-shaft H, in which position they are folded out of the way. Fig. 3 shows the position of the parts at the moment that the sheaves have been dumped, and the end of the rod Q, striking the end of the slot R, giving the said bar the impetus required. In order to raise the fingers J into the horizontal position they appear in Fig. 1, the driver presses on the opposite arm of the foot-crank A, so as to rock the rod E in the opposite direction. This movement forces the crank F in the direction of the arrow shown in Fig. 3, and by pulling on the rod I draws the bracket G away from the shoulder a, thus rocking the rock-shaft H, so as to raise the ends of the fingers J clear of the stubble before the end of the rod Q has reached the end of the slot R, so as to give the bar P a longitudinal movement opposite to that which it has previously moved, thereby forcing the fingers J back into the horizontal position. From this description it will be seen that we have provided mechanism for operating the fingers J in such a manner that the said fingers will first drop to discharge the sheaves and then swing around clear of everything, and that in returning the fingers to their initial position they are first raised clear of the stubble and then moved to the horizontal position necessary to constitute them a sheaf-carrier. Owing to the fact that each finger is pivoted in a horizontal journal, so that it is capable of an independent vertical movement, the weight of the sheaves will not put the operating mechanism into action, whereas should the fingers come in contact with a stump or other obstruction the whole carrier will instantly swing clear of the said obstruction.

We may mention here that the amount of drop the fingers J shall have is regulated by the position of the shoulder a, the lower the said shoulder the greater the drop.

In order to prevent the grain on the fingers clogging the moving parts of said fingers, we place a board T, as indicated in Fig. 1.

With the view of holding the sheaves on the fingers J until the said fingers are dropped we provide the curved fingers U, which are connected to the bar V, hinged, as indicated at b, in such a manner that the said bar, with its fingers may be folded back out of the way on top of the binder. Under the hinge is a stop v to support and hold the fingers U in position for use.

What we claim as our invention is—

1. In a sheaf-carrier, a series of fingers located at the discharge side of the binder-table, each finger independently carried on a horizontal journal-box provided with a vertical stud fitted into a suitable bearing-box on a rocking bar H, in combination with the arm O, reciprocating slotted bar P, and mechanism for giving the desired motion to said rocking bar H and the arm O, substantially as and for the purpose specified.

2. A rolling rod E, suitably journaled to the frame of the machine and having a double crank F formed at its lower end, and a bracket G, fixed to a journaled rock-shaft H and connected to the crank F, in combination with a series of fingers J, independently journaled in journal-boxes M, each journal-box having a vertical stud N, which is journaled in a bracket fixed to the rock-shaft H, and intermediate connection between said boxes M and the double crank, substantially as and for the purpose specified.

3. In a sheaf-carrier, a series of fingers J, each finger carried in a pivoted journal-box M, mounted on a rock-shaft H, having a bracket G, and each journal-box connected to a bar P, having a slot R made in it, in combination with the rod Q, working in said slot, crank F, rock-shaft E, carrying said crank, and connections between said bracket G and crank F, all arranged and operating substantially as and for the purpose specified.

Brantford, November 16, 1891.

LYMAN M. JONES.
JAMES K. WEDLAKE.

In presence of—
JAMES HARLEY,
G. A. WHITAKER.